United States Patent [19]

Kemble et al.

[11] Patent Number: 4,988,036

[45] Date of Patent: Jan. 29, 1991

[54] VACUUM BRAZE CYCLE FOR CLAD ALUMINUM SHEET

[75] Inventors: Gary A. Kemble, Lockport; Melvin C. Nietopski, Cheektowaga; Joseph P. DiFonzo, Lewiston, all of N.Y.

[73] Assignee: General Motors Corporation, Detroit, Mich.

[21] Appl. No.: 506,128

[22] Filed: Apr. 9, 1990

[51] Int. Cl.$^5$ .............................................. B23K 103/10
[52] U.S. Cl. ................................. 228/217; 228/197; 228/227; 228/263.17
[58] Field of Search ............... 228/196, 197, 183, 217, 228/227, 232, 263.17

[56] References Cited

U.S. PATENT DOCUMENTS

| | | | |
|---|---|---|---|
| 3,321,828 | 5/1967 | Miller | 29/488 |
| 3,373,482 | 3/1968 | Miller | 29/501 |
| 3,673,678 | 7/1972 | Moreau et al. | 29/494 |
| 3,852,873 | 12/1974 | Chartet | 29/487 |
| 3,917,151 | 11/1975 | Robinson | 228/220 |
| 4,143,802 | 3/1979 | Winterbottom | 228/217 |
| 4,240,574 | 12/1980 | Schmatz et al. | 228/217 |
| 4,401,254 | 8/1983 | Tramontini | 228/217 |
| 4,705,206 | 11/1987 | Kamiya et al. | 228/263.17 |
| 4,781,888 | 11/1988 | Hagiwara et al. | 228/263.17 |
| 4,838,474 | 6/1989 | Ohashi et al. | 228/263.17 |

Primary Examiner—Sam Heinrich
Attorney, Agent, or Firm—Douglas D. Fekete

[57] ABSTRACT

An improved heating cycle for brazing an assembly of clad aluminum sheet components having a hypoeutectic aluminum-silicon braze alloy cladding comprises a dwell at a temperature slightly above the eutectic melting point and effective to partially melt the cladding. The dwell is accompanied by vaporization of residual magnesium from the clad alloy to getter oxygen from about the assembly and enhanced disruption of oxide film on the cladding surface, which film would otherwise interfere with capillary flow of the braze alloy into joints. The eutectic temperature dwell provides a more uniform flow of braze alloy into seams and thereby produces a strong, leak-free joint in the brazed structure.

2 Claims, No Drawings

VACUUM BRAZE CYCLE FOR CLAD ALUMINUM SHEET

BACKGROUND OF THE INVENTION

This invention relates to vacuum brazing of clad aluminum sheet components into an integral structure to manufacture an automotive evaporator core or the like. More particularly, this invention relates to a vacuum brazing cycle that includes a pre-brazing dwell at a temperature near the aluminum-silicon eutectic melting point to partially melt the clad alloy prior to heating to a higher temperature to complete melting and effectuate flow into joints Automotive radiators and the like are formed by brazing an assembly of clad aluminum sheet components. The components are formed of a low-silicon aluminum alloy core having a cladding composed of a hypoeutectic aluminum-silicon braze alloy A typical aluminum braze alloy contains between about 9 and 11 weight percent silicon and is composed predominantly of eutectic phase, but includes proeutectic aluminum phase dispersed within the eutectic matrix. The braze alloy further comprises between about 0.07 and 0.25 percent magnesium that vaporizes during brazing.

The clad assembly is heated to a temperature effective to melt the low melting braze alloy without harming the core alloy. The braze melt is drawn by capillary action into the seams and, upon cooling, solidifies to form the desired braze bond. The result is a leak-free joint between components.

Brazing is particularly sensitive to the presence of oxygen and, therefore, is carried out in a vacuum. To further reduce oxidation, as the assembly is heated, but prior to braze melting, magnesium vaporizes and scavenges residual oxygen from the environment. Nevertheless, there remains alumina film on the surface of the cladding as the result of exposure to air during forming and assembly. This film may be diminished by the magnesium vaporization. As the brazing cycle progresses, the molten alloy swells and exudes through thin regions, discontinuities, or other defects in the film, thereby breaking up the film and dispersing its material in the braze melt. Failure to disrupt the surface oxide film inhibits uniform flow of braze alloy into the seam and may produce a defect in the brazed joint. Thus, the formation of defects in the oxide film and the exudation of molten alloy to break up the film are critical steps in the braze bonding process.

Therefore, it is an object of this invention to provide an improved method for brazing a clad aluminum sheet assembly into an integral structure that facilitates formation of leak-free joints between components.

More particularly, it is an object of this invention to provide an improved vacuum brazing heating cycle for bonding clad aluminum sheet alloy components, which cycle includes a dwell wherein the braze alloy is maintained in a partially molten state not only to enhance magnesium vaporization and gettering of oxygen from about the assembly, but also to promote exudation of the molten braze alloy to disrupt and disperse residual surface oxide, thereby providing more uniform flow of braze alloy into seams between components to produce leak-free joints in the bonded product.

SUMMARY OF THE INVENTION

In accordance with a preferred embodiment of this invention, these and other objects are accomplished by an improved heating cycle for vacuum brazing of braze clad aluminum sheet assembly that includes a dwell at a temperature near the eutectic melting point to partially melt the braze alloy without completely melting the cladding so as to effectuate capillary flow into seams. The components carry a braze cladding composed of between about 9 and 11 percent silicon and between 0.07 and 0.25 weight percent magnesium. A preferred dwell temperature range is between about 1071° F., the melting point of a eutectic composition of aluminum and 11.5 percent silicon, and 1073° F. The preferred dwell is effective to create a liquefied near-eutectic phase within the cladding, with residual still-solid proeutectic phase derived from the excess aluminum. Despite a magnesium burst at about 1025° F. during the initial heating prior to achieving dwell temperature, it is found that the dwell is accompanied by vaporization of additional magnesium. It is believed that release of the residual magnesium increases defects in the alumina film on the cladding surface, as well as scavenging ambient oxygen from about the assembly. Also during the dwell, expansion of the alloy, enhanced by the solid-liquid transition, causes exudation of the liquid metal through the alumina film, thereby disrupting the film and dispersing residual alumina in the molten alloy. The presence of unmelted proeutectic phase retards flow of the braze alloy to enhance dispersement of the residual alumina. Thereafter, the cladding is gradually heated to a higher temperature to complete melting of the braze alloy and to effectuate capillary flow of the molten alloy, into joints, whereafter cooling solidifies the alloy to produce a strong braze bond between the faying components. It is found that the eutectic dwell in accordance with this invention produces a more uniform flow of braze alloy into joints and thereby promotes a continuous braze bond between components.

DETAILED DESCRIPTION OF THE INVENTION

In accordance with a preferred embodiment, the brazing cycle of this invention is employed to produce an automotive radiator Individual components are formed of clad aluminum sheet and arranged in a desired configuration. The components comprise an aluminum alloy substrate composed of between about 0.2 and 0.5 weight percent copper, 1.0 and 1.5 weight percent manganese, not greater than 0.5 weight percent silicon, and the balance aluminum and impurities. The substrate carries a braze alloy cladding composed of a hypoeutectic alloy containing about 11 percent silicon and 0.2 weight percent magnesium. Lubricant applied during mill and forming operations is removed from the assembly by degreasing prior to brazing.

For brazing, the assembly is loaded into a vacuum furnace. The furnace is evacuated to approximately $5 \times 10^{-3}$ torr. The assembly is rapidly heated to a temperature of about 800° F. and held for about five minutes to equalize the temperature within the furnace. Thereafter, the assembly is heated to a temperature between about 1071° F. and 1073° F. As the temperature is gradually increased, substantial magnesium vaporization occurs at about 1025° F., as indicated by an increase in furnace pressure. The assembly is held at the dwell temperature for between about 7 and 9 minutes. Thereafter, the temperature is gradually increased to about 1080° F. at a rate of about 1° F. per minute and thereafter to 1092° F. at a rate of about 15° F. per minute. The assembly is held at 1092° F. for about 3 minutes and then cooled to room temperature. Visual inspection of the bonded assembly indicates a more uniform and sound fillet between faying surfaces.

Thus, as in the described embodiment, the method of this invention includes a dwell at the eutectic melting point. This dwell follows a substantial burst at about 1025° F. of vaporized magnesium released from the cladding Nevertheless, the dwell is accompanied by a further burst of additional magnesium. It is believed that, despite the initial burst, significant magnesium remains in the cladding due to the relatively slow nature of solid state diffusion. Upon formation of liquid phase, the increased activity and diffusion in the liquid promotes vaporization of the residual magnesium. This release of additional magnesium is effective to further scavenge oxygen from the cladding surface, creating weaknesses and discontinuities in the oxide film. Swelling of the alloy due to thermal expansion and solid-to-liquid phase transformation causes liquid alloy to exude through the weaknesses and discontinuities, thereby breaking up the film. However, the temperature of the dwell is preferably not sufficient to complete liquefication of the braze alloy and initiate substantial capillary flow of the braze alloy into joints. The presence of unmelted proeutectic is believed to retard the flow. The dwell is preferably maintained for a time sufficient to allow a condition approaching equilibrium to become established within the partially molten clad layer, thereby maximizing the vaporization of oxygen-scavengering magnesium and also to optimize disruption of the film by exudation prior to commencing significant braze alloy flow. A dwell time of between 7 and 10 minutes is found to be effective. Thereafter, the temperature is gradually increased at a relatively slow rate on the order of 1° F. per minute to complete melting of the clad alloy and initiate slow melt flow into joints. This gradual temperature increase facilitates the dispersing of residual oxide within the molten alloy. The assembly is then rapidly heated to the maximum temperature, which was about 1092° F. in the described embodiment, to accelerate capillary activity within the molten braze alloy layer that causes the alloy to fill the joints.

While this invention has been described in terms of certain embodiments thereof, it will be appreciated that other forms could be readily adapted by those skilled in the art. Accordingly, the scope of the invention is to be considered limited only by the following claims.

The embodiments of the invention in which an exclusive property or privilege is claimed are defined as follows:

1. A method for manufacturing a braze bonded aluminum sheet structure comprising arranging clad aluminum sheet components in an assembly having a seam between the components, said aluminum sheet components including a braze cladding composed of hypoeutectic aluminum-silicon alloy containing magnesium, and carrying an oxide film on the surface thereof, and brazing the assembly by heating the cladding to melt the braze alloy and to cause the molten braze alloy to flow into the seam, said brazing further comprising initially heating the cladding to a first temperature to vaporize magnesium from the braze alloy, heating to a second, relatively higher temperature to melt a portion of the braze alloy without initiating significant alloy flow into the seam, maintaining the cladding at said second temperature for a time effective to vaporize residual magnesium from the braze alloy and to disrupt the surface oxide film by exudation, and thereafter heating the assembly to a third temperature sufficient to complete melting of the cladding and to effectuate flow of the molten alloy into the seam, whereafter the braze alloy cools and solidifies to form a braze bond between the components.

2. A method for manufacturing a braze bonded aluminum sheet structure comprising arranging clad aluminum sheet components in an assembly having a seam between the components, said aluminum sheet components including a braze alloy cladding composed of between about 9 and 11 weight percent silicon and between about 0.07 and 0.25 weight percent magnesium, brazing the assembly by heating the cladding to melt the braze alloy and flowing the molten braze alloy into the seam, said brazing comprising the step of initially heating the assembly at a temperature between about 1071° F. and 1073° F. for between 7 and 10 minutes to partially melt the braze alloy prior to flow of the braze alloy, and thereafter heating to a relatively high temperature to complete melting of the cladding and to cause the molten alloy to flow into the seam, whereafter the braze alloy cools and solidifies to form a braze bond between the components.

* * * * *